United States Patent [19]
Reinecke et al.

[11] 3,850,272
[45] Nov. 26, 1974

[54] HYDROSTATIC REVERSIBLE VEHICLE DRIVE CONTROLLED BY BRAKE APPLICATION

[75] Inventors: Udo Reinecke, Dortmund-Kirchhorde; Helmut Jurgensmann, Westhofen; Josef Riedhammer; Helmut Stangl, both of Horb; Gerhard Beutler, Nagold, all of Germany

[73] Assignees: Orenstein & Koppel Aktiengesellschaft, Berlin; Brueninghaus Hydraulik GmbH, Horb, both of, Germany

[22] Filed: Mar. 12, 1973

[21] Appl. No.: 340,002

[30] Foreign Application Priority Data
July 21, 1972 Germany............................ 2264442

[52] U.S. Cl...................... 192/4 B, 60/445, 60/465
[51] Int. Cl............................................ B60k 29/02
[58] Field of Search ..................... 192/4 B

[56] References Cited
UNITED STATES PATENTS

| | | | |
|---|---|---|---|
| 3,049,884 | 8/1962 | Schroeder | 192/4 B |
| 3,349,860 | 10/1967 | Ross | 192/4 B |
| 3,390,523 | 7/1968 | Heidemann et al. | 192/4 B |

Primary Examiner—Benjamin W. Wyche
Attorney, Agent, or Firm—Walter Becker

[57] ABSTRACT

A control device for a hydrostatic reversible driving system with a braking device. A main hydraulic circuit includes a hydrostatic pump and a hydraulic motor. The hydraulic control circuit includes a control conduit from which branch conduits arranged in parallel lead into a fluid reservoir and respectively have interposed therein an output control valve operably by the high pressure part of the main circuit. There are also provided a rigid orifice, and an adjustable orifice continuously urged to its closing position and adapted to be opened in conformity with the actuation of the braking device.

3 Claims, 1 Drawing Figure

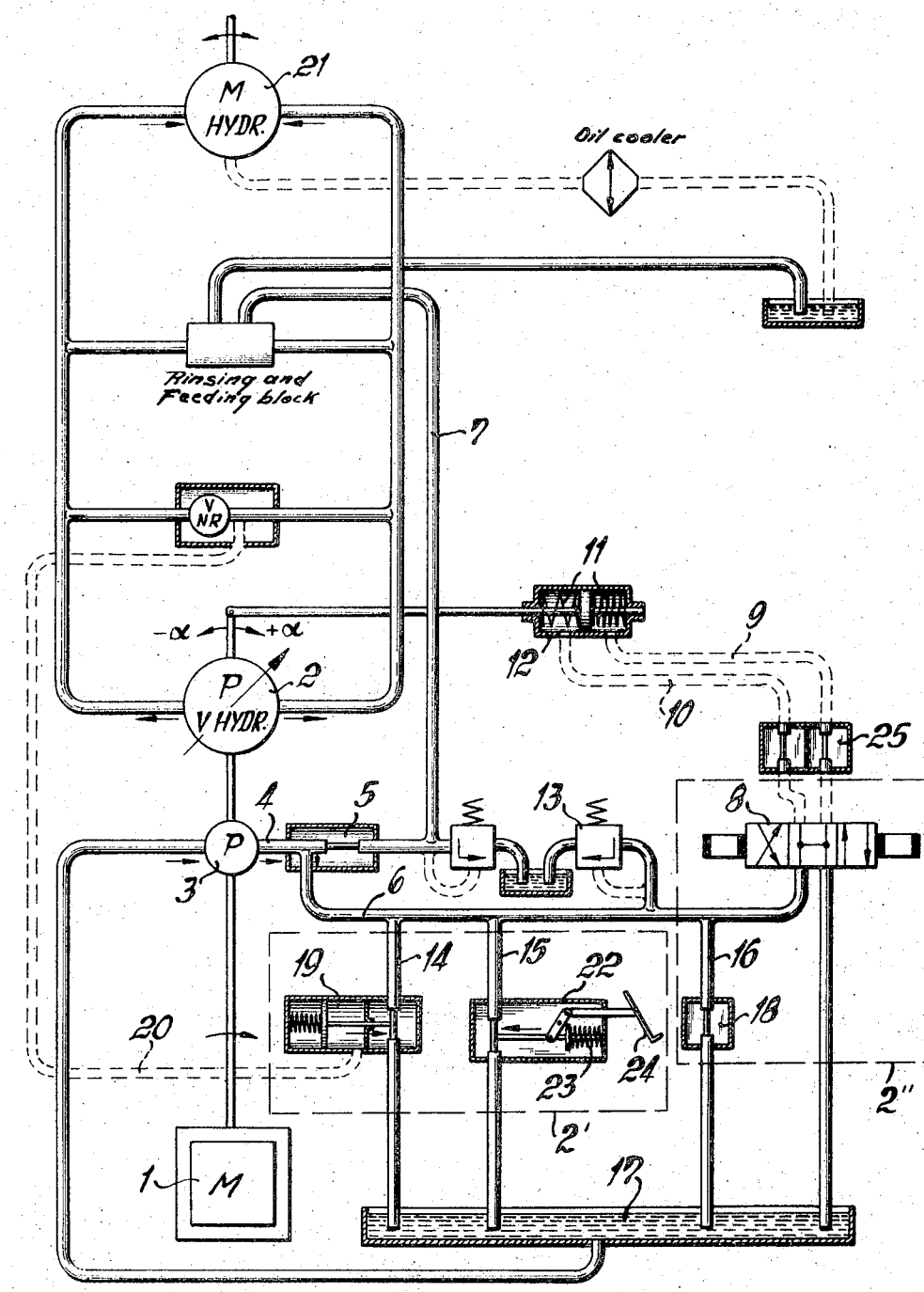

HYDROSTATIC REVERSIBLE VEHICLE DRIVE CONTROLLED BY BRAKE APPLICATION

The present invention concerns a control device for a hydroststic reversible drive with brake system. A main circuit thereof includes an axial piston pump pivotable in both directions and equipped with an adjusting device, a hydraulic motor or a plurality of hydraulic motors and a control circuit. A control pump rotates proportionally with the driving engine and acts upon the control circuit and also includes a valve for controlling the driving direction. The control circuit also controls the adjusting device.

With a heretofore known control device, a control pump is arranged on the pump shaft of the pump driven by the drive motor for the entire system, for instance a diesel engine. The control pump feeds against an orifice. With increasing speed of the drive motor, an increased back-up pressure builds up in front of the orifice. This back-up pressure is utilized for pivoting the hydrostatic pump. When the drive motor encounters too high a load in view of the driving resistance, the back-up pressure drops and the pump by means of a spring force will reduce the pivot angle and thereby the delivered quantity so that the drive motor will be relieved. With this known system the driving behavior resembles that of a truck; in this instance the pivot angle of the hydrostatic pump has to be in conformity with the maximum back-up pressure because otherwise the diesel engine will be choked off. Consequently, at half the speed of rotation of the drive motor, only a quarter of the maximum speed of the vehicle will be realized. A vehicle equipped with the known device behaves in a manner similar to that of vehicles equipped with hydrodynamic torque converters and has a sluggish acceleration. At low speeds it is necessary to operate at high speed of rotation which results in loud noises. Moreover, in view of the high starting speed, a jerk-free starting is not possible without certain auxiliary means.

According to another heretofore known system for hydrostatic transmissions, the pump delivery is varied in conformity with the respective conditions by connecting the pressure conduit of an auxiliary pump to an adjustable throttle valve through which the entire delivery of the auxiliary pump is conveyed. In this connection the pressure drop at the throttle valve acts upon a servo-motor so that the cross section of the throttling area will change when a predetermined pressure is exceeded. With this heretofore known system, the speed of the drive motor is constant which means is too high at certain working conditions with the result that a considerable engine noise develops and an unusually high fuel consumption as well as considerable wear occurs. Moreover, a vehicle equipped with this type of drive starts its driving phase at low speeds in a jerky manner.

Another heretofore known system concerns a vehicle drive which can be so controlled that a highly sensitive and short driving movement can be realized. This system is intended in particular to meet the requirements which are to be met when operating fork lifts. With this known device it is possible to increase the speed of the internal combustion engine intended for driving the entire vehicle, even when the vehicle is at a standstill, in case a load is to be lifted. Moreover, the vehicle must be able, when setting down the load, to carry out very short and precisely controllable movements. This known system, however, lacks the output-responsive reaction of the vehicle drive. Therefore, if the vehicle resistance exceeds a certain load, the drive must correct the control of the pump correspondingly.

It is, therefore, an object of the present invention to overcome the above mentioned drawbacks and to adapt the driving behavior to the following five different driving conditions to an optimum degree:

1. A soft jerk-free driving start is to be realized, while starting from the idling speed of the driving engine.

2. When driving the vehicle while it is empty, as is the case, for instance, when returning from the place of use to the garage or when driving from one place of use to another place of use, the speed, following a soft converter-like driving start as it is customary with light trucks or passenger cars, should be controllable merely by operating the gas pedal, i. e. in conformity with the speed of the driving engine.

3. To prevent overloading the motor, for instance when operating with a trailer or on steep inclines, the requirement is to be met that when the maximum load of the driving engine has been reached, a reduction in the transmission ratio, preferably in a stepless manner, should be effected, in a similar manner as it is done with trucks.

4. When actuating the drive control valve and/or when reducing the motor speed, the vehicle should come to a soft stop or should be braked in a quantitatively regulated manner. Inasmuch as an operational brake is provided in the system, the drive control valve must not reduce the delivery of the pump so suddenly that the wheels will block instantaneously.

5. The particular behavior essential for fork lifts, the so-called crawl behavior, which is necessary, for instance, for closely approaching a storage place for lifting or lowering a load, should at high motor speed be controllable by centimeters, which means that in spite of the high motor speed the driving velocity must be low and must even be zero. For facilitating this behavior, the actuation must be able to be effected by means of the brake which is present anyhow.

These and other objects and advantages of the invention will appear more clearly from the following specification in connection with the accompanying drawing diagrammatically illustrating the hydraulic circuit according to the present invention.

The control device for a hydrostatic reversible drive with braking device comprises a main circuit including an axial piston pump pivotable in both directions and is equipped with an adjusting device. Furthermore the same comprises one or more hydraulic motors and a control circuit with a control pump rotating proportionally with the driving engine and with a drive control valve. The same is characterized primarily in that from a control conduit parallel conduits branch off which lead into a tank and have interposed therein a rigid orifice. An output control valve is adapted to be acted upon by the high pressure part of the main circuit through a conduit. There is provided an adjustable orifice which is held in closed condition by a spring and which is adapted to be controlled in steps electrically, mechanically, or hydraulically in conformity with the actuation of a braking device.

According to a further development of the invention as represented in the drawing, at least two of the following elements consisting of the drive control valve 8, the orifice 18, the adjustable orifice 22 and the output control valve 19, are combined in a structural unit 2' or 2" and arranged on a hydrostatic pump 2.

Referring now to the drawing in detail, the internal combustion engine 1 directly drives the pump 2 which preferably is designed as a hydrostatic adjustable pump. The control pump 3 is likewise directly driven by the engine 1 serving at the same time as delivery pump for the closed circuit of the hydrostatic drive. The oil flow controlled by the control pump 3 is conveyed through conduit 4 to a flow divider 5. The latter divides the oil flow into a control flow conveyed through conduit 6 and into a feeding flow conveyed through the conduit 7. The control flow passing through conduit 6 flows through the drive control valve 8. Thereby the forward and rearward drive of the vehicle is controlled and furthermore passes through throttling devices 25 arranged in conduits 9 and 10 to the adjustable control device 12. The latter is set in such a way that, when no pressure prevails in the circuit, it is held in its intermediate position by springs 11. The maximum control pressure is set by means of the pressure limiting valve 13. Three parallel conduits 14, 15, 16 branch off from the conduit 6. The conduit 16 leading to the tank 17 has interposed therein an orifice 18 by means of which a control pressure in conduit 6 is produced which corresponds to the speed of the engine 1 and thus to the delivery of the control pump 3. The conduit 14 which likewise leads to the tank 17 has an output limiting valve 19 interposed therein which is arranged in parallel to the orifice 18. Valve 19 controlled through conduit 20 by the pressure prevailing between the hydrostatic pump 2 and the hydraulic motor 21. Furthermore, arranged in parallel with the orifice 18 and the output limiting valve 19, there is an adjustable orifice 22 which is interposed in the conduit 15 leading to the tank 17. This adjustable orifice 22 is closed by means of a spring 23 and is opened by actuating the brake pedal 24.

The device according to the present invention operates as follows: The fixed orifice 18 is so selected that already in view of an increase in the speed by from 300 to 500 rpm over the idling speed, the pressure in the control conduit 6 increases to the maximum value of the pressure limiting or relief valve 13 so that a full tilting movement of pump 2 will result. The output limiting valve 19 is designed in conformity with the possible output of the combustion engine 1. If only the fixed orifice 18 were provided, a complete tilting movement of pump 2 would be effected with the result that the internal combustion engine 1 would be choked off at higher driving resistances. The output limiting valve 19 which is controlled through the conduit 20, however, brings about that the pressure in conduit 6 will be lowered to such an extent that the delivery flow of pump 2 is adapted or varied in conformity with the output of the internal combustion engine 1. In view of the parallel arrangement of orifice 18 and valve 19, the speed of motor 1 and the driving speed will be proportional to each other within the region above the orifice end speed, which means the speed of the motor 1, at which the maximum control pressure is realized. If the adjustable orifice 22 is opened by actuation of the brake pedal 24, the pressure in the control conduit 6 will drop and the vehicle decreases its speed. With this arrangement, the crawl speed, necessary with wheel loaders and fork loaders for a precise and danger-proof driving behavior, will be obtained without having to sacrifice the full speed of the drive motor 1. In view of the connection of the adjustable orifice 22 with the brake pedal 24, the brake can easily be operated.

As will be evident from the above, the advantage of the control system according to the present invention consists primarily in that a very sensitive reversible drive is created which is adapted to be controlled in a stepless manner. Thereby, following a soft driving start, it is possible to obtain directly a highly satisfactory acceleration. Moreover, even with high driving resistance, as for instance on steep slopes, a choking off of the motor will be safely prevented with the control system according to the present invention. On inclines or slopes there will not only be realized a safe and controlled drive, but the vehicle when parked can neither on a plane surface nor on a slope accidentally start to move. Moreover, in connection with the above referred to advantageous driving behavior, also the crawl speed, which is particularly important for fork lifts, is realized which allows the vehicle to advance by centimeters while at the same time the high speed of the drive motor is maintained.

It is, of course, to be understood that the present invention is, by no means, limited to the specific circuit shown in the drawing but also comprises any modifications within the scope of the appended claims. Thus, instead of a single pump also a multiple pump may be employed. The adjustment of the adjustable orifice may also be effected in steps instead of in a stepless manner.

What we claim is:

1. A control device for a hydrostatic reversible driving system with a braking device, which includes: a main hydraulic circuit comprising a hydrostatic pump having a pump body portion pivotable in opposite directions and equipped with an adjusting device, and hydraulic motor means, and also includes a hydraulic control circuit comprising a driving engine, a control pump drivingly connected to said driving engine so as to rotate at a speed proportional to the speed of said driving engine, said control pump also being hydraulically connected to said hydraulic control circuit, and driving direction control valve means operatively connected to said adjusting device, said hydraulic control circuit also comprising: fluid reservoir means, a main control conduit, first and second and third branch conduits branching off from said main control conduit and arranged in parallel to each other and communicating with said fluid reservoir means, rigid orifice means interposed in said first branch conduit, output control valve means operatively connected to said main hydraulic circuit and interposed in said second conduit, adjustable orifice means interposed in said third conduit and movable from a closed position to an open position and vice versa, and spring means associated with said adjustable orifice means and continuously urging the same to its closed position, said adjustable orifice means being operatively connected to said braking device so as to be movable to its open position in conformity with the actuation of said braking device.

2. A control device according to claim 1, which includes control conduit means leading from said direction control valve means to said adjusting device, and throttle means interposed in said control means.

3. A control device according to claim 1, in which of said direction control valve means and the means interposed in said branch conduits at least two are combined in a structural unit and arranged on said hydrostatic pump.

* * * * *